United States Patent
Lee et al.

(10) Patent No.: US 6,940,966 B2
(45) Date of Patent: Sep. 6, 2005

(54) METHOD AND APPARATUS FOR DETECTION OF A TELEPHONE CPE ALERTING SIGNAL

(75) Inventors: Julian Lee, Vancouver (CA); Gary Louie, Vancouver (CA)

(73) Assignee: VTech Telecommunications, Ltd., Tai Po (HK)

( * ) Notice: Subject to any disclaimer, the term of this patent is extended or adjusted under 35 U.S.C. 154(b) by 282 days.

(21) Appl. No.: 10/079,969

(22) Filed: Feb. 21, 2002

(65) Prior Publication Data

US 2003/0156709 A1 Aug. 21, 2003

(51) Int. Cl.[7] .................................................. H04M 3/22
(52) U.S. Cl. ..................... 379/386; 379/377; 379/351; 379/142.01
(58) Field of Search ................................ 379/377, 386, 379/357, 142.01

(56) References Cited

U.S. PATENT DOCUMENTS

| 5,214,693 A | * | 5/1993 | Chujo | 379/386 |
| 5,519,774 A | | 5/1996 | Battista et al. | 379/386 |
| 5,809,133 A | * | 9/1998 | Bartkowiak et al. | 379/386 |
| 5,896,560 A | * | 4/1999 | Pfiefer et al. | 455/701 |
| 6,122,353 A | | 9/2000 | Brady et al. | 379/142 |

* cited by examiner

Primary Examiner—Sinh Tran
Assistant Examiner—Walter F Briney, III
(74) Attorney, Agent, or Firm—Pillsbury Winthrop Shaw Pittman LLP

(57) ABSTRACT

A method and apparatus for detecting a signaling tone within a communications channel, such as a telephone line, is presented. The energy level of the communications channel signal is measured at the frequency of the signaling tone and at one or more frequencies that are integer divisors of the signaling tone (i.e. at one or more subharmonics). The subharmonic energies are evaluated in determining whether the signaling tone is present. The technique can be implemented using a plurality of resonators and a comparator.

18 Claims, 4 Drawing Sheets

METHOD AND APPARATUS FOR DETECTION OF A TELEPHONE CPE ALERTING SIGNAL

BACKGROUND OF THE INVENTION

1. Field of the Invention

This invention relates in general to telephone communications. In particular, the invention relates to an improved technique for the detection of signaling tones, such as those associated with caller identification services, transmitted over a voice communications link.

2. Background Art

In recent years, numerous advanced telecommunications features have become readily available to home and business telephone users. One such feature that has attained great popularity is caller identification, often referred to as "caller ID" or "CID". Conventional caller ID systems typically involve the transmission of data identifying or corresponding to the calling party's telephone number and/or name from the telephone company central office switch to a called party's CID-capable telephone set or CID box. This data is transmitted over the telephone line during the "silent" period following the first ring of the called party's telephone set. The called party is thus able to determine the identity of the calling party before answering the incoming call. Additionally, if the called party is unavailable or elects not to answer the incoming call, a record of calls received can be stored locally in the memory of the CID-capable telephone set or CID box for later reference by the user. Such conventional caller ID service only operates when the called party's phone is "on hook", i.e. when the called party is not engaged in a telephone conversation.

Conventional caller ID has been further improved through the implementation of a system known as Type II caller ID. Type II CID expands upon the functionality of conventional CID by combining conventional caller ID with a "call waiting" service. A call waiting service operates during an ongoing telephone conversation by audibly signaling a called party to indicate that a second calling party has placed a call to the called party's phone. The called party upon hearing a signal tone can elect to put the first call on hold and establish a connection with the second calling party. After having completed talking to the second calling party, the called party can reestablish a connection with and resume talking to the first party.

However, unlike conventional CID, Type II CID also operates while a called party is already engaged in a telephone conversation and receives a telephone call from a second party. The system first notifies the user of the incoming call by transmitting an audible "call waiting" tone, and then proceeds to transmit Type II CID data to the called party thereby identifying the second calling party. Just as in traditional caller ID, the new caller's information is displayed on the Type II CID-capable telephone set or CID box. Thus, the user is able to determine the relative importance of a newly received call, and to decide whether to interrupt the call in which the user is already engaged by switching over to the second call.

Several standards have been developed for the implementation of Type II CID, such as the BellCore GR-3004 specification, or the BT 202 specification. Such standards dictate that Type II CID operation is initiated via the transmission of a specific signal over the telephone line during the telephone conversation. This signal is known as the Customer Premises Equipment Alerting Signal ("CAS").

According to the BellCore specification, the CAS is a dual-tone signal consisting of a 2130 Hz tone and a 2750 Hz tone, sometimes called CAS tone A and CAS tone B, respectively. When the CAS is detected by the Type II CID-capable customer premises equipment ("CPE") such as a cordless telephone set, the CPE initiates a brief digital communications link with the central office by acknowledging receipt and recognition of the CAS by the CPE. This in turn causes the central office to transmit the modulated digital CID data that is then received by the called party's CPE and displayed on the Type II CID-capable telephone set or CID box display.

To avoid interrupting the user's telephone conversation with an unpleasant burst of noise when the digital communications occur, the CPE mutes the user's audio signal as soon as the CAS is detected. The CID data is then transmitted during the muted period in a brief burst of digital data, after which the caller can continue the current conversation experiencing minimal interruption. If the transmitted CAS tones are not detected by the CPE due to the calling party's telephone set not being Type II enabled, the CPE will not send the requisite acknowledgement signal, and the system will not transmit the CID information to the user. This CPE acknowledgement feature prevents users of CPE without Type II CID functionality from being subjected to a loud burst of digital noise while the CID data is transmitted unnecessarily each time a call waiting signal is received. However, it is also possible that Type II CID-equipped CPE can nevertheless fail to detect a valid CAS, thereby depriving the user of the Type II CID functionality. Furthermore, if the CPE detects CAS tones when a CAS has not in fact been sent by the central office (a "false" CAS detection), the user's telephone conversation is unnecessarily interrupted while the CPE mutes the audio signal to attempt digital communications with the central office. Thus, crucial to the effective implementation of Type II CID is the reliable detection of CAS tones received from the central office, as well as the reliable rejection of false CAS tones.

This CAS detection task is often particularly difficult because the CAS is transmitted over the same channel on which the telephonic audio communications are taking place, at the same time during which these same communications are taking place, and within the same limited frequency bandwidth supported by modern telephone networks. Many techniques may be used by the CPE to detect dual tone frequencies such as a CAS, including analog bandpass filtering followed by a peak detector or PLL, or digital techniques that use digital filtering or discrete Fourier transforms (DTF). Additionally, several techniques are known which are specifically intended to improve the reliability of CAS detection. Such techniques often involve setting stricter standards for the detected CAS signal that must be satisfied before the CAS will be considered to be genuine. These include setting tight criteria for characteristics such as the signal duration, the difference in signal levels between tones in the dual-tone CAS, the allowable frequency of each CAS tone, or the signal level of each tone with respect to the remainder of the voiceband frequencies or some subset thereof. However, as the tightness of such criteria is increased, the system becomes increasingly likely to fail to identify a genuine CAS tone due to uncontrollable variations in the CAS signaling and noise and distortion within the communications channel. Such failures to detect the Type II CID CAS are highly undesirable.

One technique to improve CAS detection reliability is set forth in U.S. Pat. No. 6,122,353 issued to Brady et al., which discloses a technique whereby the CPE's audio signal is muted or disconnected altogether from the transmission channel as soon a potential CAS is detected. The CPE then continues to monitor the CAS on the telephone line for its remaining duration while the near-end audio input remains muted. If the output of the CAS detection mechanism continues to indicate the presence of a CAS even absent the near-end audio (which has been removed due to the audio signal being disconnected), then the incoming signal is likely to be a genuine CAS being received from the central office rather than a spurious product of the audio signal produced by the near-end telephone. However, this technique fails to eliminate interruptions caused by false CAS detections, because the near-end audio must still be muted. Rather, it only decreases the disruption (i.e. decreases the duration of the erroneous muting period) caused by the false CAS detections originating from near-end voice signals, while failing to eliminate false CAS detections caused by voice signals coming from the calling party.

Another method to improve CAS detection reliability involves measuring the energy of the CAS and comparing that energy to the overall energy present in the voiceband channel. If a valid CAS were present, then there would likely be a significant difference in energies between the CAS energy level and the energy level of the remainder of the channel. If it is determined that the energy across the voiceband channel is roughly the same as, or within a certain margin of, the measured CAS, then the CAS would be rejected as a probable by-product of complex audio signals on the telephone line. Unfortunately, this technique very often cannot distinguish between valid but speech-corrupted CAS tones and signals with high energy levels at the CAS tone frequencies due instead to overall very high levels of audio energy across the voiceband channel, thereby resulting in the occasional failure to properly deliver the Type II CID data.

Another technique is disclosed by U.S. Pat. No. 5,519,774, issued to Battista et al., in which select sampled bandwidths are chosen specifically from the upper portion of the voiceband, between the frequencies of 2000 and 3000 Hz in which energy from typical voice signals is likely to be low. The measured energies are then weighted by an experimentally-derived weighting function using a complex adaptive algorithm and compared to the energy levels measured at the CAS frequencies to determine whether a detected CAS is valid. However, this technique requires an iterative experimental procedure and prior knowledge of false CAS detections to optimize the complex adaptive algorithm that implements the technique and obtain good performance. Also, the technique's high level of complexity adds to the cost, size and power consumption of products that implement it.

Thus, it is desirable and an object of the invention to provide simple and comparatively inexpensive technique for the reliable detection of CAS signaling.

SUMMARY OF THE INVENTION

A method and apparatus for detecting a predetermined signaling tone within a signal conveyed by a communications channel is presented. The energy of the channel is measured at the frequency of the predetermined signaling tone and at a frequency that is an integer divisor of the predetermined signaling tone frequency. The signaling tone is determined to be present when the result of the first measurement exceeds a threshold derived from the result of the second measurement. In one embodiment, this threshold is approximately six decibels greater than the second measurement. The energies can be determined by measuring the outputs of resonators tuned, respectively, to the predetermined signaling tone frequency and to an integer divisor of the signaling tone frequency.

Detection of the signaling tone may also require that the energies of signals at one or more guard band frequencies do not exceed a threshold derived from the signaling tone energy. The guard band energy threshold may be equal to one fourth of the measured signaling tone energy. Detection of the signaling tone may also require that the measured signaling tone energy exceeds a minimum acceptable energy level for a valid signaling tone and/or does not exceed a maximum acceptable energy level for a valid signaling tone. One or more additional measurements of the communications channel energy at frequencies that are further integer divisors of the signaling tone frequency may be made in detecting the presence of the signaling tone. The signaling tone is then determined to be present if the measured signaling tone energy also exceeds the one or more additional measurements by at least a predetermined threshold.

A method is provided particularly to detect a customer premises equipment alerting signal received on a telephone line. The signal energies present on the telephone line can be measured at the frequencies of one or more signaling tones comprising the customer premises equipment alerting signal, at one or more sub-harmonic frequencies of each of the one or more signaling tones and optionally at one or more guard band frequencies for each of the one or more signaling tones. These measurements are then compared to appropriate thresholds to determine if the alerting signal is present.

A telephone alerting signal detector is presented which detects a signaling tone on a communications channel. The detector is comprised of a signaling tone resonator, one or more sub-harmonic resonators and one or more guard band resonators. The resonators are tuned to the frequency of the signaling tone, to the integer divisors of the signaling tone frequency and to guard band frequencies. The detector is further comprised of a comparator that includes inputs derived from the outputs of the signaling tone resonator, sub-harmonic resonators and guard band resonators, and inputs corresponding to minimum and maximum signaling tone levels.

The comparator output may indicate the presence of the signaling tone if the resonator outputs indicate that the signaling tone energy exceeds the sub-harmonic energy by a predetermined amount, such as six decibels. The comparator output may further require that the signaling tone energy exceeds the guard band energy by a desired degree, such as by a factor of four, before the signaling tone is detected. The comparator output may also require that the signaling tone energy satisfies predetermined maximum and/or minimum energy criterion before a signaling tone is detected.

DETAILED DESCRIPTION OF DRAWINGS

Figure 1:
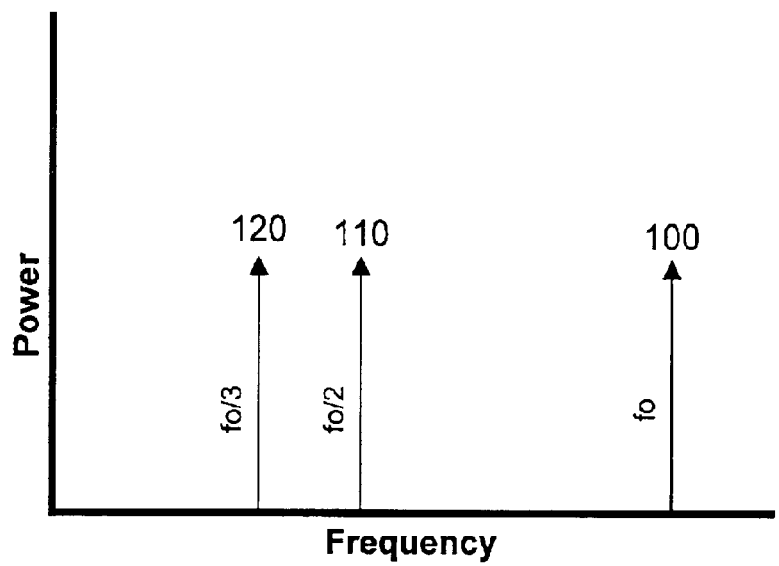
FIG. 1 is a plot depicting the relationship between a fundamental frequency and its associated second and third sub-harmonic frequencies.

While this invention is susceptible to embodiment in many different forms, there are shown in the drawings and will be described in detail herein representative embodiments. The present disclosure is to be considered as an exemplification of the principle of the invention intended merely to explain and illustrate the invention, and is not intended to limit the invention in any way to embodiments illustrated.

Speech is often comprised of complex tones that include significant harmonic content. While it is very difficult for a person's voice to directly produce simultaneously, for example, the 2130 Hz and 2750 Hz tones that could mimic the CAS under the BellCore Type II CID specification, it is much more likely for speech to contain signals at the sub-harmonics of the two CAS frequencies. Such sub-harmonic signals are likely to contain energy at the CAS tone frequencies, and are thus likely to be improperly detected as a CAS. Thus, by specifically examining the sub-harmonics of a detected tone rather than other portions of the channel bandwidth, false detections of the tone of interest can often be reliably avoided without significantly desensitizing the detector to valid tone signals of interest.

A sub-harmonic frequency is an integral divisor of the fundamental frequency. This relationship between a fundamental frequency and associated sub-harmonic frequencies is depicted in the plot of FIG. 1. Two sub-harmonics of fundamental tone 100 are illustrated. The frequency of second sub-harmonic 110 equals the frequency of fundamental 100 divided by 2, and the frequency of third sub-harmonic 120 is equal to the frequency of fundamental 100 divided by 3. Thus, the second sub-harmonic of BellCore CAS tone A is the frequency of CAS tone A divided by 2 (2130 Hz/2=1065 Hz). Likewise, the third sub-harmonic of CAS tone A is the frequency of CAS tone A divided by 3 (2130 Hz/3=710 Hz). The second and third sub-harmonics of CAS tone B are similarly calculated to be 1375 Hz and 916.7 Hz, respectively.

It may be advantageous to consider sub-harmonics in evaluating the authenticity of a tone signal such as a CAS because most audible sounds other than noise are comprised largely of energy content at their fundamental frequencies and integer multiples of that fundamental frequency. Therefore, sounds with fundamental frequencies at sub-harmonics of the CAS tones are sounds whose harmonics are likely to fall at the same frequency as the CAS tones. Thus, if high-energy harmonic-rich signals are present at the CAS tone sub-harmonic frequencies, then the harmonics of those signals may appear similar to CAS tones. Because typical voice communications contain harmonic-rich signals in the range of these specific sub-harmonic frequencies, the associated harmonic signals could then likely result in a false CAS detection and subsequent interruption of the communications on the telephone line as the CPE erroneously seeks to initiate digital communications with the central office.

Because a CAS is comprised of pure tones at the CAS A and CAS B frequencies, the CAS itself does not normally contain any significant energy content at sub-harmonic frequencies. Furthermore, harmonics of a signal are normally lower in level than the fundamental frequency signal, such that harmonic energy at CAS frequencies resulting from sub-harmonic signals will normally be lower in energy than the sub-harmonic signals themselves.

Figure 2:
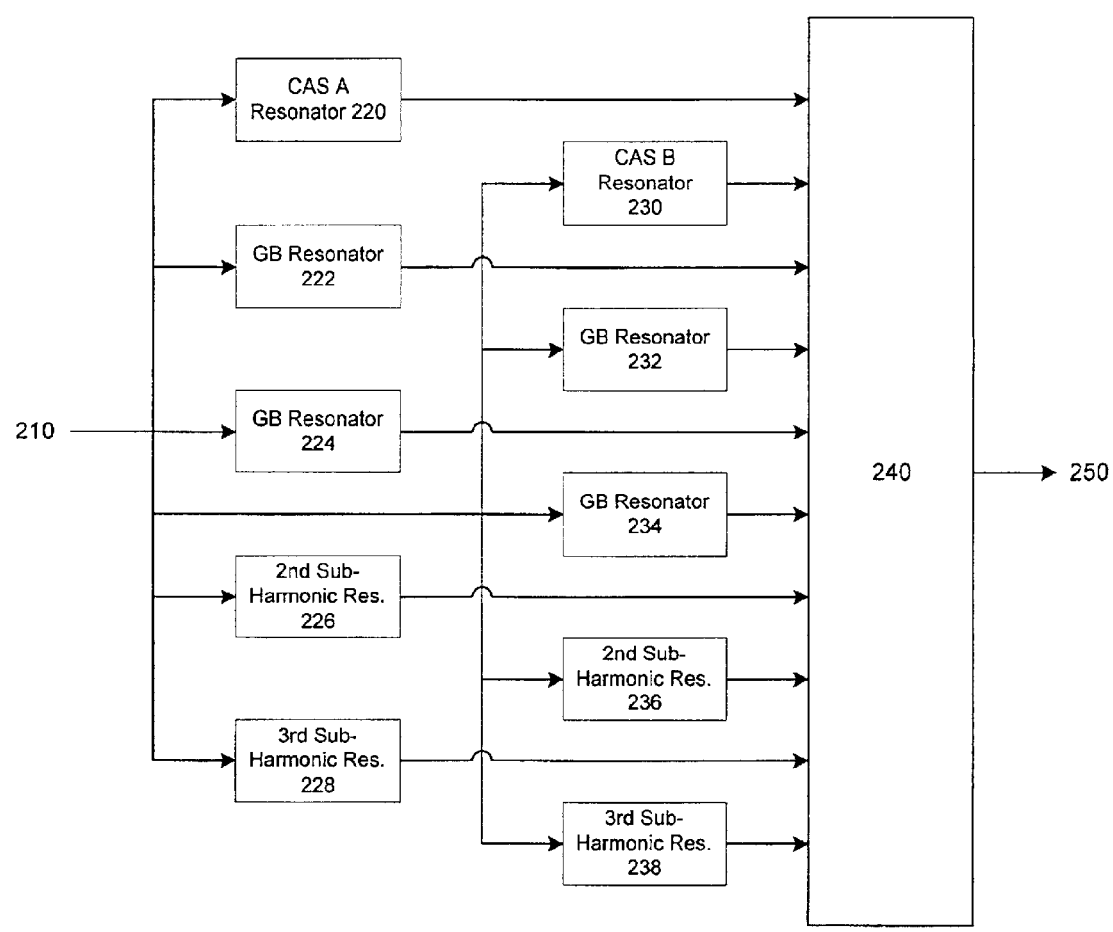
FIG. 2 is a block diagram of a CAS detector according to one embodiment of the invention

A CAS detector utilizing these properties to reject false CAS signals is illustrated in the functional block diagram of FIG. 2, and may be implemented, for example, via software by a microprocessor, digital signal processor or application specific integrated circuit found within the base unit of a cordless telephone system. In the embodiment of FIG. 2, the digitized audio input from a telephone line is input on line 210, and is fed to a plurality of Goertzel resonators, namely, resonators 220, 222, 224, 226, 228, 230, 232, 234, 236 and 238.

The Goertzel resonators act to measure the energy level at a specific tuned frequency. Specifically, the output of the Goertzel resonator is the magnitude squared of the tuned frequency component of the discrete Fourier transform of the input signal. In one embodiment of the invention, the resonators are implemented with a frame size of 200 samples (N=200) with a sample frequency of 8 kHz. However, it is understood that the energy levels at particular frequencies could alternatively be measured by a variety of techniques, both analog and digital and optionally including Goertzel or other resonators of varying designs, without departing from the scope of the invention.

The output of each of the resonators 220 through 238 is passed to comparator block 240. Comparator block 240 acts to compare the values of the resonator outputs to each other and/or various predetermined values to identify when a valid CAS is received via signaling on output 250.

Figure 3:
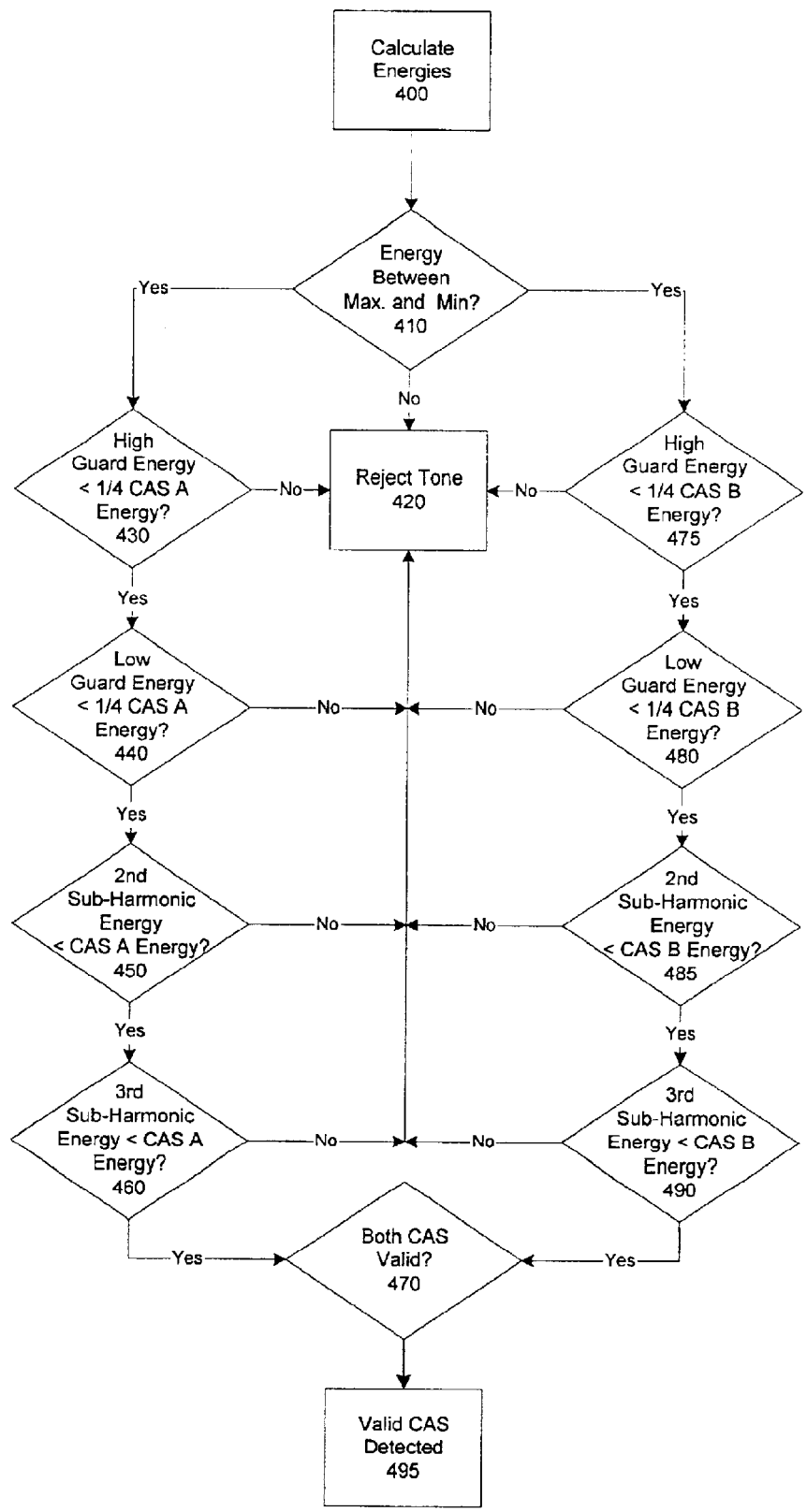
FIG. 3 is a flowchart of a method for detecting a valid CAS tone.

The flowchart of FIG. 3 illustrates the operation of the detector of FIG. 2, according to one embodiment of the invention. In step 400, the signal energies are measured at CAS tone A and CAS tone B, as well as at the CAS tone sub-harmonics of both CAS tones A and B, by resonators 220-238. Specifically, resonator 220 is tuned to CAS tone A, resonator 226 is tuned to the second sub-harmonic of CAS tone A and resonator 228 is tuned to the third sub-harmonic of CAS tone A. Similarly, resonator 230 is tuned to CAS tone B, resonator 236 is tuned to the second sub-harmonic of CAS tone B and resonator 238 is tuned to the third sub-harmonic of CAS tone B.

However, because resonators typically respond to a range of frequencies centered on the desired frequency to be measured, a single resonator may not yield sufficient information to accurately determine that a tone at a particular CAS tone frequency is being detected. Thus, it may be desirable to employ additional resonators as guard band resonators to triangulate the frequency being measured and provide a more accurate response. In the embodiment of FIG. 2, guard band resonator 222 is tuned to a frequency slightly below that of CAS tone A, and guard band resonator 224 is tuned to a frequency slightly above that of CAS tone A. Similarly, guard band resonator 232 is tuned to a frequency slightly below that of CAS tone B, and guard band resonator 234 is tuned to a frequency slightly above that of CAS tone B.

Figure 4:
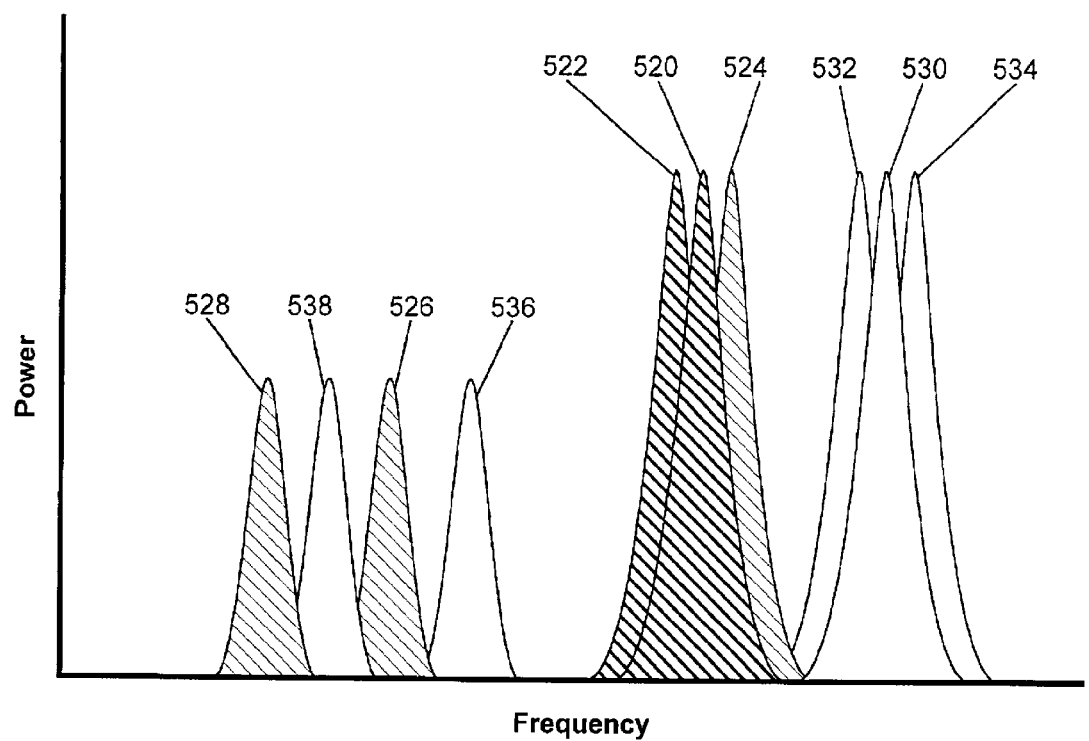
FIG. 4 is a plot depicting the relative frequency responses of the detector resonators.

FIG. 4 illustrates the frequency responses of the various resonators 220–238. Response 520 corresponds to resonator 220, and is centered upon the frequency of CAS tone A. Guard band resonators 222 and 224 correspond to frequency responses 522 and 524, which are respectively positioned at frequencies lower than and higher than the frequency of CAS tone A. Frequency response 526 of resonator 226 is centered at the second sub-harmonic of CAS tone A. Frequency response 528 of resonator 228 is centered at the third sub-harmonic of CAS tone A. Similarly, resonators 230-238 correspond to frequency responses 530–538 and are centered at various frequencies associated with CAS tone B: response 530 is centered on the CAS tone B frequency; low guard band resonator response 532 and high guard band resonator response 534 are positioned at frequencies that are slightly lower than and higher than that of response 530, respectively; and resonator frequency responses 536 and 538 are centered on the second sub-harmonic and third sub-harmonic of CAS tone B, respectively. Because, as mentioned and illustrated, such resonators typically respond to a range of frequencies centered on the frequency to which the resonator is tuned, it is understood that the tuning frequencies of the resonators may deviate slightly from their theoretical values without substantially impacting the operation of the illustrated device. In FIG. 4, resonator frequencies associated with CAS tone A are shown hatched and resonator frequencies associated with CAS tone B are shown non-hatched.

Returning to FIG. 3, in steps 410 through 490, the various energies calculated in step 400 are compared to determine the validity of the detected tones. In step 410, comparator 240 compares the total energy detected by all resonators to predetermined maximum and minimum values. If the total energy value does not fall between the predetermined maximum and minimum values, then comparator 240 determines that the tones detected are not a valid CAS signal, step 420.

If the total detected energy level is within the valid range for a CAS, then the detector proceeds to determine whether the energy present at the CAS tone A frequency is indicative of a CAS. In step 430, the energy detected by CAS tone A high guard band resonator 224 is compared to that of CAS tone A resonator 220, step 430. If the guard band resonator's energy level exceeds a predetermined portion of the CAS tone resonator energy level, then the tone is not deemed to be a valid CAS, i.e., the energy measured by the resonator tuned to the CAS tone is likely to be due to a broadband signal, rather than a pure CAS tone. In the embodiment of FIG. 2, if comparator 240 determines that the energy of resonator 224 is not less than one fourth of the energy of CAS tone A resonator 220 in step 430, the tone is rejected, step 420. Similarly, in step 440 the low guard band energy of resonator 222 is compared to the energy measured by CAS tone A resonator 220. If the energy of resonator 222 is not less than one fourth of the energy of resonator 220, the tone is rejected, step 420.

In addition to examining the guard band resonators to determine whether a tone is present at the frequency of CAS tone A, the sub-harmonics of CAS tone A are also examined. The energy present at the second CAS tone A sub-harmonic, as determined by resonator 226, is compared to the energy of CAS tone A resonator 220 by comparator 240 in step 450. If the sub-harmonic energy exceeds the CAS tone energy, the tone is rejected, step 420. Finally, in step 260 the energy present at the third CAS tone A sub-harmonic, as measured by resonator 228, is compared to the energy of CAS tone A resonator 220. If the third sub-harmonic energy exceeds the CAS tone energy, the tone is also rejected, step 420. Otherwise, the detector is deemed to have detected a valid CAS tone A.

An analogous CAS tone detection and verification process is also performed for CAS tone B. The energy detected by high guard band resonator 234 is compared to that of CAS tone B resonator 230 at step 475. If the guard band energy exceeds one fourth of the CAS tone B energy, the tone is rejected, step 420. Similarly, in step 480 the low guard band energy of resonator 232 is compared to the CAS tone B energy of resonator 230. If the low guard band energy exceeds one fourth of the CAS tone energy, the tone is also rejected, step 420. The energy present at the second CAS tone B sub-harmonic is compared to the CAS tone B energy in step 485. If the second sub-harmonic energy exceeds the CAS tone energy, the tone is rejected, step 420. Finally, in step 490 the energy present at the third CAS tone B sub-harmonic is compared to the CAS tone B energy. If the third sub-harmonic energy exceeds the CAS tone energy, the tone is also rejected at step 420.

Finally, in step 470 the detector determines whether both of CAS tones A and B have been determined to be valid. If so, then it is determined that there has been a valid CAS detection, step 495, and further Type II CID communications between the CPE and the home office may ensue.

In other embodiments, the various thresholds to which the CAS tone energies are compared can be scaled by varying amounts. For example, to further reduce the opportunity for false detection of a CAS, the detector can require that the CAS tone energy levels exceed the sub-harmonic energy levels by a desired amount, such as 6 dB, in order for the CAS tone to be deemed valid in comparison steps 450, 460, 485 and 495. In such an embodiment, if the level detected at the frequency of CAS tone A is −30 dBm and the level at the third sub-harmonic frequency of CAS tone A is measured to be −35 dBm, then the detection would be rejected since the third sub-harmonic is less than 6 dB lower than the fundamental tone. Implementing such an increased threshold helps ensure that a CAS is not improperly detected even when harmonic-rich signals are present even at a plurality of CAS sub-harmonics.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

We claim:

1. A method for detecting a predetermined signaling tone within a signal conveyed by a communications channel, the method comprising:

performing a first measurement of the energy of the communications channel signal at the frequency of the predetermined signaling tone;

performing a second measurement of the energy of the communications channel signal at a frequency that is an integer divisor of the predetermined signaling tone frequency;

performing one or more guard band measurements of the energy of the signals conveyed by the communications channel at respective one or more guard band frequencies, the guard band frequencies chosen to lie just above or just below a corresponding signaling tone frequency; and determining that the signaling tone is present when the result of the first measurement exceeds a first threshold, where the first threshold is derived from the result of the second measurement, and when the results of the guard band measurements do not exceed a second threshold, where the second threshold is derived from the result of the first measurement.

2. The method of claim 1, in which the first threshold is approximately six decibels greater than the second measurement.

3. The method of claim 1, in which the step of performing a first measurement is further comprised of the substeps of applying the communications channel signal to a first resonator tuned to the frequency of the predetermined signaling tone; and measuring the output of the first resonator and in which the step of performing a second measurement is further comprised of the substeps of applying the communications channel signal to a second resonator tuned to an integer divisor of the signaling tone frequency; and measuring the output of the second resonator.

4. The method of claim 1, wherein a plurality of guard band measurements are performed, and wherein each guard band measurement does not exceed the second threshold.

5. The method of claim 4, in which the second threshold is equal to one fourth of the first measurement.

6. The method of claim 1, in which the step of determining that the signaling tone is present is further comprised of the substep of determining that the result of the first measurement exceeds a third threshold, where the third threshold is predetermined to be indicative of a minimum acceptable energy level for a valid signaling tone.

7. The method of claim 1, in which the step of determining that the signaling tone is present is further comprised of the substep of determining that the result of the first measurement does not exceed a fourth threshold, where the fourth threshold is predetermined to be indicative of the maximum acceptable energy level for a valid signaling tone.

8. The method of claim 6, in which the step of determining that the signaling tone is present is further comprised of the substep of determining that the result of the first measurement does not exceed a fourth threshold, where the fourth threshold is predetermined to be indicative of the maximum acceptable energy level for a valid signaling tone.

9. The method of claim 1, which method further includes the step of performing one or more further measurements of the energy of the communications channel signal, each further measurement being at a frequency that is an integer divisor of the predetermined signaling tone frequency; and in which the step of determining that the signaling tone is present further includes the substep of determining that the result of the first measurement exceeds one or more further thresholds, where the further thresholds are derived from the results of the further measurements.

10. The method of claim 9, in which step of performing one or more further measurements is comprised of the substeps of applying the communications channel signal to one or more further resonators, each further resonator being tuned to a frequency that is an integer divisor of the predetermined signaling tone frequency; and measuring the outputs of each of the further resonators.

11. A method for detecting a customer premises equipment alerting signal comprised of one or more signaling tones received on a telephone line by a telephone while voice or other audible communications are occurring on the telephone line, which method is comprised of:

measuring the signal energies present on the telephone line at the frequencies of the one or more signaling tones;

measuring the signal energies present at one or more sub-harmonic frequencies of each of the one or more signaling tones;

measuring the signal energies present at one or more guard band frequencies, the guard band frequencies chosen to lie just above or just below a corresponding signaling tone frequency; and determining that the alerting signal is present when the energy of each signaling tone frequency exceeds a threshold derived from the energies measured at the one or more sub-harmonic frequencies for each signaling tone, and when the energy of each signaling tone frequency exceeds a threshold derived from the energy measured at the one or more guard band frequencies of that signaling tone.

12. The method of claim 11, in which the step of determining that the alerting signal is present is further comprised of the substep of determining that the energy of each signaling tone exceeds a predetermined minimum signaling tone energy level.

13. The method of claim 12, in which the step of determining that the alerting signal is present is further comprised of the substep of determining that the energy of each signaling tone does not exceed a predetermined maximum signaling tone energy level.

14. A telephone alerting signal detector for detecting the presence of a signaling tone on a communications channel, the detector comprising:

a signaling tone resonator tuned to the frequency of the signaling tone; one or more sub-harmonic resonators, each sub-harmonic resonator being tuned to a frequency that is an integer divisor of the signaling tone frequency;

one or more guard band resonators, each guard band resonator being tuned to a frequency that is slightly greater than or less than the signaling tone frequency;

a comparator including inputs that are derived from the outputs of the signaling tone and sub-harmonic resonators and from the guard band resonator outputs, whereby the output of the comparator is indicative of the presence of the signaling tone if the signaling tone resonator output exceeds a first threshold derived from the sub-harmonic resonator outputs, and if the signaling tone resonator output exceeds a second threshold, where the second threshold is derived from the guard band resonator levels.

15. The telephone alerting signal detector of claim 14, in which the comparator further includes an input corresponding to a predetermined minimum signaling tone level, such that the comparator output is indicative of the presence of the signaling tone if the signaling tone resonator output exceeds the first threshold and the predetermined minimum signaling tone level.

16. The telephone alerting signal detector of claim 15, in which the comparator further includes an input corresponding to a predetermined maximum signaling tone level, such that the comparator output is indicative of the presence of the signaling tone if the signaling tone resonator output exceeds the first threshold and the predetermined minimum signaling tone level, and the predetermined maximum signaling tone level exceeds the signaling tone resonator output.

17. The telephone alerting signal detector of claim 14, in which the first threshold is approximately six decibels greater than the greatest of the one or more sub-harmonic resonator outputs.

18. The telephone alerting signal detector of claim 14, in which the second threshold is approximately four times the level of the greatest guard band resonator output.

* * * * *